United States Patent
Klemenz et al.

(10) Patent No.: US 8,644,542 B2
(45) Date of Patent: Feb. 4, 2014

(54) HEARING AID WITH WIRELESS BATTERY CHARGING CAPABILITY

(75) Inventors: Harald Klemenz, Fuerth (DE); Pei Chyi Kristy Lim, Fuerth (DE); Benjamin Neumann, Nuremberg (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 0 days.

(21) Appl. No.: 13/394,867

(22) PCT Filed: Sep. 8, 2009

(86) PCT No.: PCT/SG2009/000322
§ 371 (c)(1),
(2), (4) Date: Mar. 8, 2012

(87) PCT Pub. No.: WO2011/031233
PCT Pub. Date: Mar. 17, 2011

(65) Prior Publication Data
US 2012/0170781 A1    Jul. 5, 2012

(51) Int. Cl.
*H04R 25/00*    (2006.01)
(52) U.S. Cl.
USPC .......................... 381/323; 381/328; 381/331
(58) Field of Classification Search
USPC ................. 381/322, 323, 324, 328, 330, 331;
320/107, 108; 429/163, 164, 176, 186
See application file for complete search history.

(56) References Cited

U.S. PATENT DOCUMENTS

| | | | |
|---|---|---|---|
| 4,379,988 A | 4/1983 | Mattatall | |
| 6,040,680 A | 3/2000 | Toya et al. | |
| 6,310,960 B1 * | 10/2001 | Saaski et al. | 381/323 |
| 6,498,455 B2 * | 12/2002 | Zink et al. | 320/108 |
| 6,658,124 B1 * | 12/2003 | Meadows | 381/323 |
| 7,620,195 B2 * | 11/2009 | Bengtsson et al. | 381/323 |
| 2008/0205678 A1 | 8/2008 | Boguslavskij et al. | |
| 2009/0096413 A1 | 4/2009 | Partovi et al. | |

FOREIGN PATENT DOCUMENTS

DE        36 33 722 C1    11/1987
EP        0 263 294 A2    4/1988

OTHER PUBLICATIONS

Andre Kurs et al.: "Wireless Power Transfer via Strongly Coupled Magnetic Resonances", www.sciencemag.org Science vol. 317, Jul. 6, 2007, pp. 83-86.

* cited by examiner

*Primary Examiner* — Huyen D Le
(74) *Attorney, Agent, or Firm* — Laurence A. Greenberg; Werner H. Stemer; Ralph E. Locher

(57) ABSTRACT

In an embodiment, a hearing aid is provided. The hearing aid may include a set of battery charging terminals configured to be connected to a battery. A receiver oscillator circuit is electrically coupled to the set of battery charging terminals, the receiver oscillator circuit includes a receiver coil. The receiver coil may be tuned to resonate at a resonance frequency in a range of MHz and at the resonance frequency. The receiver coil may be configured to receive magnetic energy in the form of electromagnetic waves of a frequency similar to the resonance frequency of the receiver coil and to convert the magnetic energy of the received electromagnetic waves to an electrical current to charge the battery via the set of battery charging terminals.

13 Claims, 8 Drawing Sheets

← electric field
◁----- magnetic field

← electric field
◁----- magnetic field

HEARING AID WITH WIRELESS BATTERY CHARGING CAPABILITY

BACKGROUND OF THE INVENTION

Field of the Invention

Embodiments relate to a hearing aid with wireless battery charging capability.

A hearing aid is usually fitted in or behind the ear of the user to amplify the sound for the user. Some popular types of hearing aids include behind-the-ear (BTE) hearing aids, in-the-ear (ITE) hearing aids, in-the-canal (ITC) hearing aids, completely-in-the-canal (CIC) hearing aids, etc.

A hearing aid usually includes a battery to provide power for electrical component(s) housed within. For charging of the battery, a hearing aid user may remove the hearing aid from the ear. Then the hearing aid user may bring the hearing aid together with the battery into direct electrical contact with a battery charger or remove the battery from the hearing aid and bring only the battery into direct electrical contact with the battery charger.

BRIEF SUMMARY OF THE INVENTION

In various embodiments, a hearing aid may be provided, which may allow wireless battery charging capability which may eliminate a need to remove the hearing aid from the ear of the hearing aid user and reduce any inconvenience to the hearing aid user. The hearing aid with the wireless battery charging capability may also allow for charging of the battery at any time in a suitable environment without disruption to the usage of the hearing aid user.

An embodiment relates to a hearing aid. The hearing aid may include a set of battery charging terminals configured to be connected to a battery, a receiver oscillator circuit electrically coupled to the set of battery charging terminals; the receiver oscillator circuit including a receiver coil; wherein the receiver coil may be tuned to resonate at a resonance frequency in a range of MHz and at the resonance frequency, the receiver coil may be configured to receive a magnetic energy in the form of electromagnetic waves of a frequency similar to the resonance frequency of the receiver coil and to convert the magnetic energy of the received electromagnetic waves to an electrical current to charge the battery via the set of battery charging terminals.

In an embodiment, the electromagnetic waves may be radio waves occurring on the radio frequency portion of the electromagnetic spectrum. The range of the electromagnetic waves may vary from the high frequency (HF) band (for example 3 to 30 MHz), to the very high frequency (VHF) band (for example 30 to 300 MHz), to the ultra high frequency (UHF) band (for example 300 to 1000 MHz), for example.

In an embodiment, the receiver coil may be electrically coupled to the set of battery charging terminals via a wire(s) or an electrical interconnect(s). The wire(s) or electrical interconnect(s) may be of any suitable dimension or number depending on user and design requirements. The wire(s) or electrical interconnect(s) may be positioned at any suitable position within the hearing aid as long as there may be an electrical connection between the receiver coil and the battery charging terminals.

In an embodiment, the receiver coil may be an inductor or a transformer.

In an embodiment, the receiver oscillator circuit may further include a receiver resistor. The receiver resistor may be of any suitable value depending on the voltage applied and current flowing through the receiver oscillator circuit. The presence of the receiver resistor may prevent a short circuit in the receiver oscillator circuit when operating at the resonance frequency of the receiver oscillator circuit.

In an embodiment, the receiver oscillator circuit may further include a receiver capacitor, the receiver capacitor may be variable so as to tune the receiver coil to resonate at the resonance frequency. The receiver capacitor may be positioned parallel to the battery to be connected so as to buffer the electrical current to be channeled to the battery.

In an embodiment, the resonance frequency of the receiver oscillator circuit may be the frequency at which the impedance of the receiver coil may be substantially the same as the impedance of the receiver capacitor.

In an embodiment, the hearing aid may further include a rectifying circuit electrically coupled to an output of the receiver oscillator circuit. The rectifying circuit may also be optional. The rectifying circuit may include a plurality of diodes. The rectifying circuit may be a bridge rectifier, which may include four diodes. The four diodes may lock the two phases of an input sine current signal anti-cyclically and the output may be a rippled rectified current signal.

In an embodiment, the rectifying circuit may be configured to receive an alternating current signal from the receiver oscillator circuit and to convert the alternating current signal to a direct current signal to be provided to the battery.

In an embodiment, the hearing aid may further include a loading circuit, the loading circuit may be electrically coupled to the set of battery charging terminals.

In an embodiment, the loading circuit may include an electrical component selected from a group consisting of a microphone, a signal processing circuit, a loud speaker and a volume control. The rectifying circuit, the loading circuit or the electronic component(s) may be arranged on one printed circuit board (PCB).

In an embodiment, the receiver coil may be positioned such that the receiver coil may surround the battery. The receiver coil may be dimensioned to include a same thickness as the battery or of any other suitable dimensions depending on user and design requirements.

In an embodiment, the hearing aid may further include a battery chamber housing, wherein the receiver coil may be positioned in the battery chamber housing.

In an embodiment, the hearing aid may further include a coating, the coating may be configured to partially surround the receiver coil.

In an embodiment, the coating may include a gap dimensioned and arranged to prevent the electrical current from generating a further magnetic field which may further generate a further electrical field. The coating may include more than one gap depending on user and design requirements. The gap may be in the range of mm to cm.

In an embodiment, the coating may include a permeable material. The coating may also include a flexible material so as to be able to surround the receiver coil.

In an embodiment, the coating may include a plastic hose.

In an embodiment, the hearing aid may be a behind-the-ear (BTE) hearing aid, an in-the-ear (ITE) hearing aid, an in-the-canal (ITC) hearing aid or a completely-in-the-canal (CIC) hearing aid.

In an embodiment, the transmitter coil and the receiver coil may transmit energy when tuned or made to operate at a resonance frequency.

In the drawings, like reference, characters generally refer to the same parts throughout the different views. The drawings are not necessarily to scale, emphasis instead generally being placed upon illustrating the principles of various embodiments. In the following description, various embodiments are described with reference to the following drawings, in which:

DESCRIPTION OF THE INVENTION

Figure 1:
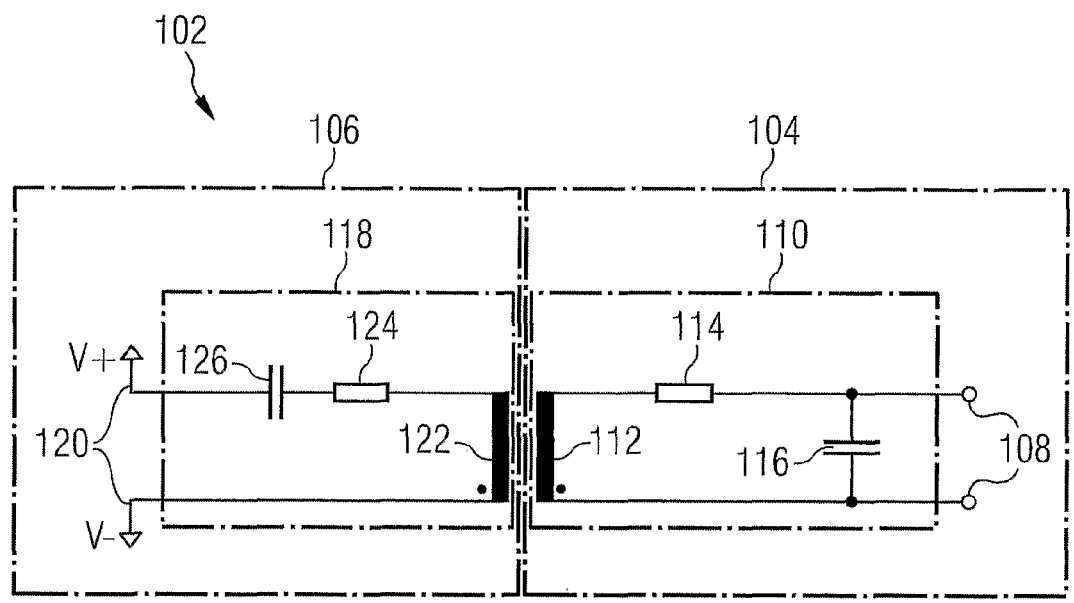
FIG. 1 shows a circuit representation of a wireless charging system for wireless charging of a hearing aid including a receiver coil according to an embodiment.

In an embodiment, wireless energy transmission from a power source (PS) to a receiver (R), for example a battery may be disclosed.

One of the principles of transmitting signals may be to include coils that, built in an oscillator, may be in resonance. Little power may be needed for signal transmission because the receiver may be good enough to detect the weak signal and the receiver may have enough power to amplify and filter the signals.

For energy transmission, a more powerful signal may be required to make the power available for use. The formula for induced voltage ($U_ind$) in a coil is:

$$U_ind = L \cdot \frac{di}{dt} \quad (1)$$

Where L: inductance
di/dt: rate of current change
which may be converted so that the required current (I) may be calculated.

$$I = \int \frac{U}{L} dt \quad (2)$$

To transmit power by using two oscillators, it may require a decent voltage level to achieve enough power coming through because the electric field (E) is defined as:

$$E = \frac{U}{d} \quad (3)$$

so the voltage or the power of the electric field drops linearly to the distance (d) between the PS and the R.

This may be compensated by increasing the voltage but it may not be recommendable to increase the electric field as the electric field may interfere with the nerve electrons of a human body.

When using an oscillator at high frequencies, it may generate two sources of fields, the electric part and the magnetic part of the wave and therefore giving rise to the name electromagnetic wave.

But because of the relationship below:

$$\nabla \times \vec{E} = -\frac{\partial B}{\partial t} \quad (4)$$

Where
$\nabla$: Magnetic field
E: Electric field
dB/dt: ratio between the amount of change in amplitude of the magnetic field (dB) and the time it takes to make that change (dt)

both waves are orthogonal. It may be possible to reduce the electric part and use only the magnetic part of the wave, which may not be dangerous. It may be feasible to use a high frequency, a high voltage to transmit and receive the power from the PS.

Technically this may be realized by using a coil that may be coated with a coating for example of a high permeable material. The coating may prevent the electric field lines to radiate into free space but more so induce another magnetic field inside the coating. As the coating may be highly permeable, no magnetic radiation may exit the coating but the magnetic radiation may stay, inside the geometry. The technical side effect of the coil with the coating may be that by using a full coating, the magnetic field may induce another electric field. To prevent this, a small gap may be inserted at some point of the coil. The transmitted energy of the coil may change from $$w_{em} = \frac{1}{2}\varepsilon_0(E^2 + c^2 B^2) \text{ with } \varepsilon: \text{ permitivity} \quad (5)$$

to $$w_m = \frac{1}{2}\varepsilon_0 c^2 B^2 \text{ with } \varepsilon: \text{ permitivity} \quad (6)$$

FIG. 1 shows a circuit representation of a wireless charging system 102 for wireless charging of a hearing aid 104 including a receiver coil 112 according to an embodiment.

The wireless charging system 102 may include a power source 106 for generating electromagnetic waves and the hearing aid 104 for receiving the electromagnetic waves so as to allow wireless charging of a battery (not shown).

In an embodiment, wireless communication may span a spectrum from about 9 kHz to about 300 GHz. In an embodiment, the electromagnetic waves may be radio waves occurring on the radio frequency portion of the electromagnetic spectrum. The range of the electromagnetic waves may vary from the high frequency (HF) band (for example 3 to 30 MHz), to the very high frequency (VHF) band (for example 30 to 300 MHz), to the ultra high frequency (UHF) band (for example 300 to 1000 MHz), for example.

In an embodiment, the wireless communication between the power source and the hearing aid may be established via radio frequency communication, microwave communication, for example long-range line-of-sight via highly directional antennas, or short-range communication, or infrared (IR) short-range communication, for example from remote controls or via infrared data association (IRDA). The wireless communication may also include wireless LAN, Bluetooth, Global Positioning System (GPS).

The hearing aid 104 may include a set of battery charging terminals 108 configured to be connected to the battery, a receiver oscillator circuit 110 electrically coupled to the set of battery charging terminals 108, the receiver oscillator circuit 110 including a receiver coil 112. The receiver coil 112 may be tuned to resonate at a resonance frequency in a range of MHz and at the resonance frequency, the receiver coil 112 may be configured to receive a magnetic energy in the form of electromagnetic waves of a frequency similar to the resonance frequency of the receiver coil 112 and to convert the magnetic energy of the received electromagnetic waves to an electrical current to charge the battery via the set of battery charging terminals 108.

The receiver oscillator circuit 110 may further include a receiver resistor 114. The receiver oscillator circuit 110 may further include a receiver capacitor 116, the receiver capacitor 116 may be variable so as to tune the receiver coil 112 to resonate at the resonance frequency.

The power source 106 for generating the electromagnetic waves of the frequency similar to the resonance frequency of the receiver coil 112 may include a transmitter oscillator circuit 118 and a driving source 120. The driving source 120 may be a voltage source. The power source 106 may be a separate device from the hearing aid 104 (may be termed a receiver) and positioned adjacent or at a distance away. The transmitter oscillator circuit 118 may include a transmitter coil 122, a transmitter resistor 124 and a transmitter capacitor 126. The driving source 120 may be electrically coupled to the transmitter oscillator circuit 118 and may be configured to provide an electrical current to drive the transmitter coil 122, thereby generating the electromagnetic waves. The electromagnetic waves may be transmitted from the transmitter coil 122 to the receiver coil 112 at the resonance frequency.

The positioning of the receiver coil 112 in relation to the transmitter coil 122 may allow a transformation to reduce the voltage level and gain current to be directed to the battery.

Further, as the transmitter coil 122 may be typically bigger than the receiver coil 112 around the battery, the number of windings may be different. The relationship between voltage and the number of windings of the transmitter coil 122 and the receiver coil 112 may be defined by the following equation:

$$\frac{U_1}{U_2} = \frac{N_1}{N_2} \qquad (7)$$

Where
U1: primary voltage (i.e. voltage across transmitter coil)
U2: secondary voltage (i.e. voltage across receiver coil)
N1: primary number of windings (i.e. transmitter coil)
N2: secondary number of windings (i.e. receiver coil)
And with a relationship between flux and inductance, current and number of windings as follows:

$$\Phi = \frac{Li}{N} \text{ or } N = \frac{L \cdot i}{\Phi}; \qquad (8)$$

Wherein
θ: flux
L: inductance
I: current

A relationship between voltage, inductance, current and flux may be derived as shown below.

$$\frac{U_1}{U_2} = \frac{\frac{L_1 \cdot i_1}{\Phi}}{\frac{L_2 \cdot i_2}{\Phi}} = \frac{L_1 \cdot i_1}{L_2 \cdot i_2} \qquad (9)$$

Figure 2:
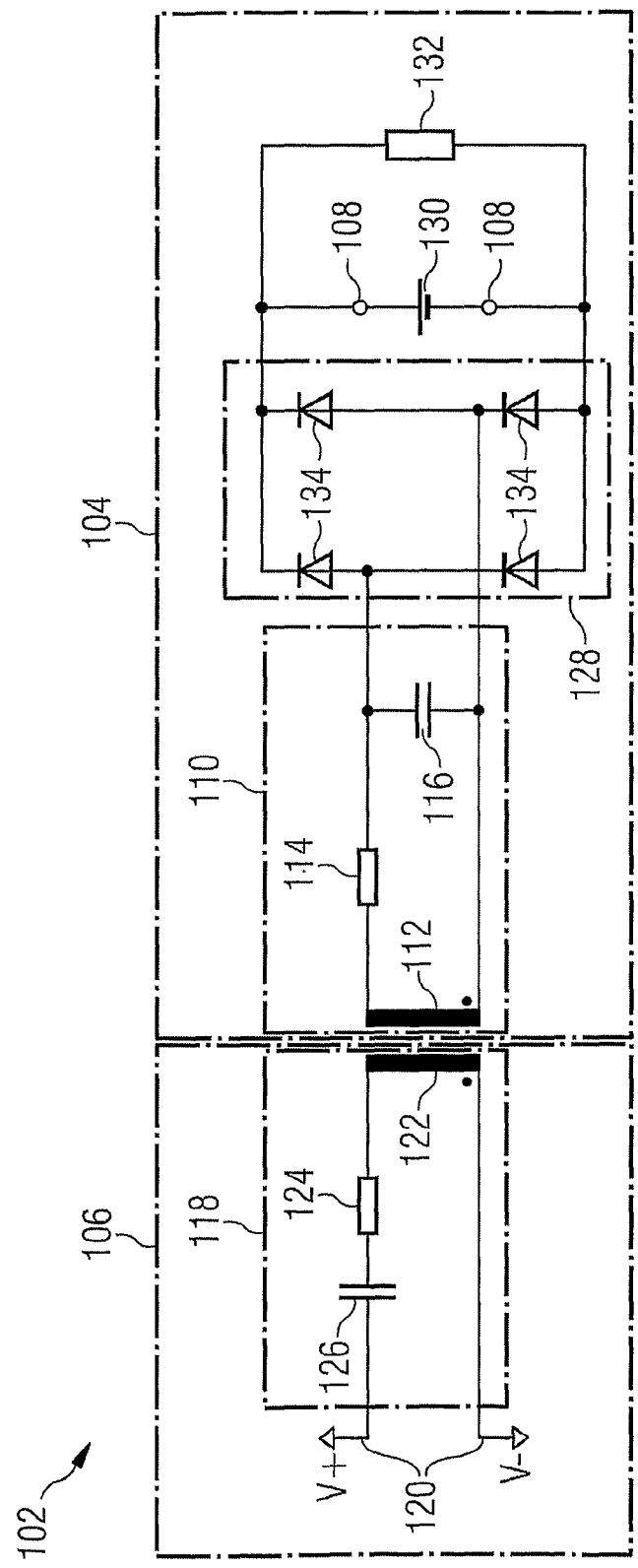
FIG. 2 shows a circuit representation of a wireless charging system for wireless charging of a hearing aid including a receiver coil, a rectifying circuit and a battery according to an embodiment.

FIG. 2 shows a circuit representation of a wireless charging system 102 for wireless charging of a hearing aid 104 including a receiver coil 112, a rectifying circuit 128 and a battery 130 according to an embodiment.

FIG. 2 is similar to FIG. 1 with the hearing aid 104 including a rectifying circuit 128, a battery 130 and a loading circuit 132.

Like in FIG. 1, the wireless charging system 102 in FIG. 2 may include a power source 106 for generating electromagnetic waves and the hearing aid 104 for receiving the electromagnetic waves so as to allow wireless charging of the battery 130.

The hearing aid 104 in FIG. 2 may include a set of battery charging terminals 108 configured to be connected (e.g. via an ohmic direct coupling) to the battery 130, a receiver oscillator circuit 110 electrically coupled to the set of battery charging terminals 108, the receiver oscillator circuit 110 including a receiver coil 112. The receiver coil 112 may be tuned to resonate at a resonance frequency in a range of MHz and at the resonance frequency, the receiver coil 112 may be configured to receive a magnetic energy in the form of electromagnetic waves of a frequency similar to the resonance frequency of the receiver coil 112 and to convert the magnetic energy of the received electromagnetic waves to an electrical current to charge the battery 130 via the set of battery charging terminals 108.

The receiver oscillator circuit 110 may further include a receiver resistor 114. The receiver oscillator circuit 110 may further include a receiver capacitor 116, the receiver capacitor 116 may be variable so as to tune the receiver coil 112 to resonate at the resonance frequency.

The power source 106 for generating the electromagnetic waves of the frequency similar to the resonance frequency of the receiver coil 112 may include a transmitter oscillator circuit 118 and a driving source 120. The driving source 120 may be a voltage source. The power source 106 may be a separate device from the hearing aid 104 (may be termed a receiver) and positioned adjacent or at a distance away. The transmitter oscillator circuit 118 may include a transmitter coil 122, a transmitter resistor 124 and a transmitter capacitor 126. The driving source 120 may be electrically coupled to the transmitter oscillator circuit 118 and may be configured to provide an electrical current to drive the transmitter coil 122, thereby generating the electromagnetic waves. The electromagnetic waves may be transmitted from the transmitter coil 122 to the receiver coil 112 at the resonance frequency.

The hearing aid 104 may further include a rectifying circuit 128 electrically coupled to an output of the receiver oscillator circuit 110. The rectifying circuit 128 may be a bridge rectifier, which may include four diodes 134. The rectifying circuit 128 may be configured to receive an alternating current signal from the receiver oscillator circuit 110 and to convert the alternating current signal to a direct current signal to be provided to the battery 130.

The hearing aid 104 may further include a loading circuit 132, the loading circuit 132 may be electrically coupled to the set of battery charging terminals 108. The loading circuit 132 may include an electrical component selected from a group consisting of a microphone, a signal processing circuit, a loud speaker and a volume control.

Figure 3:
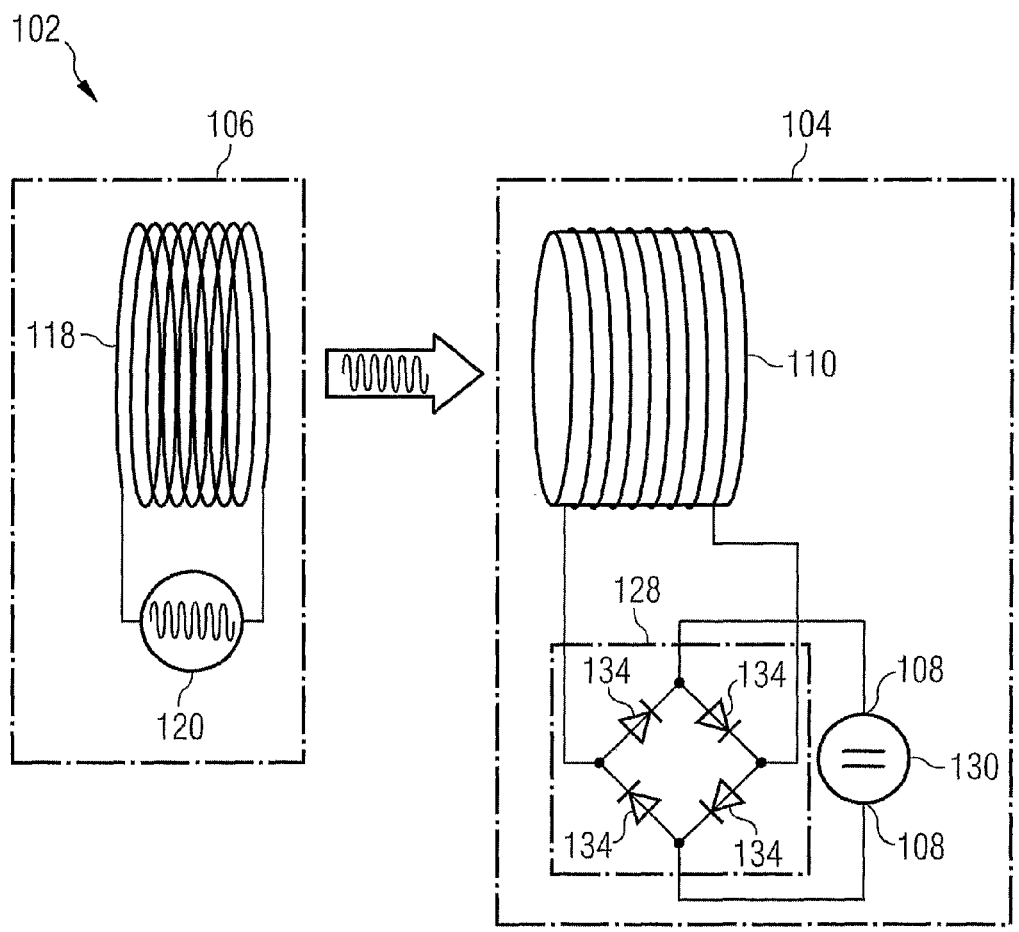
FIG. 3 shows an alternative representation of the wireless charging system of FIG. 2 according to an embodiment.

FIG. 3 shows an alternative representation of the wireless charging system 102 of FIG. 2 according to an embodiment.

Like in FIG. 2, the wireless charging system 102 in FIG. 3 may include a power source 106 for generating electromagnetic waves and the hearing aid 104 for receiving the electromagnetic waves so as to allow wireless charging of the battery 130.

The hearing aid 104 in FIG. 3 may include a set of battery charging terminals 108 configured to be connected to the battery 130, a receiver oscillator circuit 110 electrically coupled to the set of battery charging terminals 108, and a rectifying circuit 128 electrically coupled to an output of the receiver oscillator circuit 110. The rectifying circuit 128 may be a bridge rectifier, which may include four diodes 134.

The power source 106 for generating the electromagnetic waves of the frequency similar to the resonance frequency of the receiver coil 112 may include a transmitter oscillator circuit 118 electrically coupled to a driving source 120.

Figure 4:
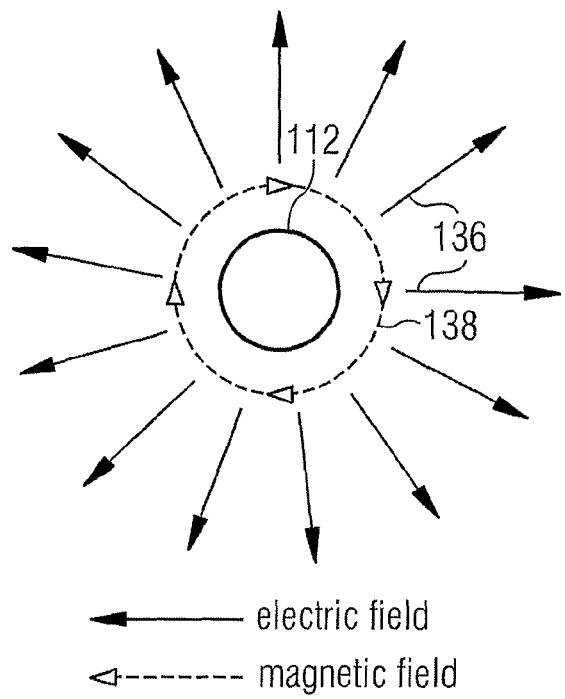
FIG. 4 shows a cross-sectional view of a receiver coil according to an embodiment.

FIG. 4 shows a cross-sectional view of a receiver coil 112 according to an embodiment. FIG. 4 shows the electric field(s) 136 and the magnetic field(s) 138 generated when the receiver coil 112 receive the magnetic energy in the form of electromagnetic waves of a frequency similar to the resonance frequency of the receiver coil 112.

The electric field(s) 136 radiate in an outward direction from the receiver coil 112 and the magnetic field(s) 138 radiate in a circular direction enclosing the receiver coil 112. The number of the electric field(s) 136 and magnetic field(s) 138 as shown may not be limited to the number as shown.

Figure 5:
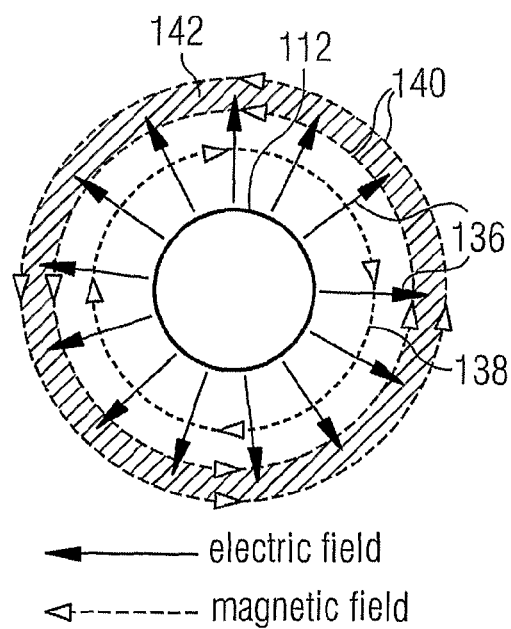
FIG. 5 shows a cross-sectional view of a receiver coil surrounded by a coating according to an embodiment.

FIG. 5 shows a cross-sectional view of a receiver coil 112 surrounded by a coating 142 according to an embodiment.

FIG. 5 may also show the electric field(s) 136 and the magnetic field(s) 138 generated when the receiver coil 112 receive the magnetic energy in the form of electromagnetic waves of a frequency similar to the resonance frequency of the receiver coil 112.

The electric fields) 136 radiate in an outward direction from the receiver coil 112 and the magnetic field(s) 138 radiate in a circular direction enclosing the receiver coil 112.

The coating 142 may prevent the electric field(s) 136 to radiate into free space but more so induce a further magnetic field(s) 140 (in an opposite direction to the magnetic field(s) 138) inside the coating 142. As the coating 142 may be highly permeable, no magnetic field (s) (radiation) or further magnetic field(s) 140 may exit the coating 142 but the magnetic field (s) or the further magnetic field(s) 140 may stay inside the coating 14. The technical side effect of the coil with the coating 142 may be that by using a full coating 142, the further magnetic field(s) 140 may induce a further electric field(s) (not shown) within the coating 142.

Figure 6:
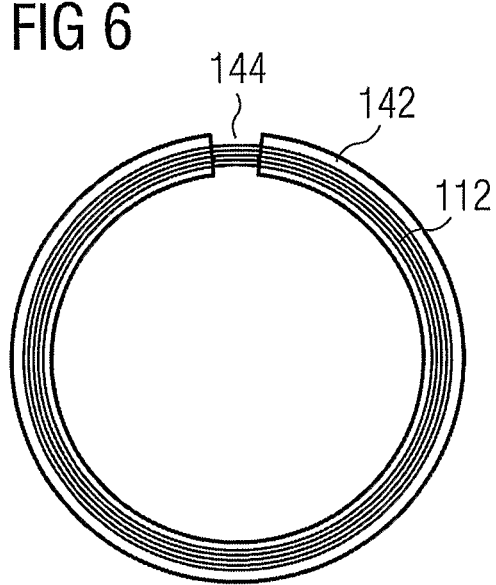
FIG. 6 shows a perspective view of a receiver coil partially surrounded by a coating according to an embodiment.

FIG. 6 shows a perspective view of receiver coil 112 partially surrounded by a coating 142 according to an embodiment.

To prevent the induction of the further electric field (not shown) within the coating 142, a gap 144 or an opening may be inserted at some point of the receiver coil 112. The gap 144 may be dimensioned and arranged to prevent the electrical current from generating a further magnetic field (not shown) which may further generate the further electric field within the coating 142.

Figure 7:
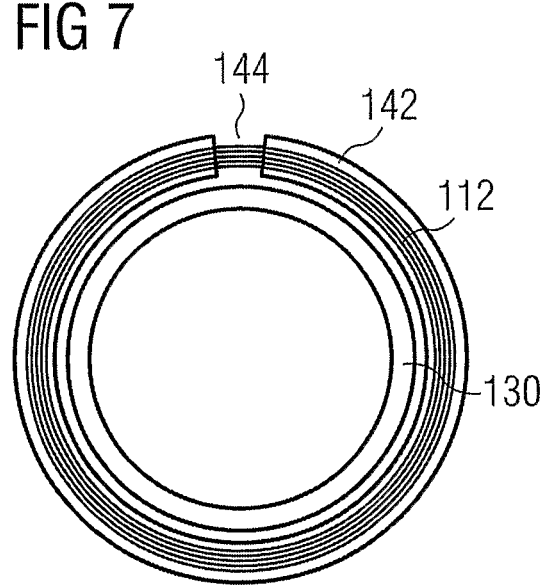
FIG. 7 shows a perspective view of the receiver coil in FIG. 6 surrounding a battery according to an embodiment.

FIG. 7 shows a perspective view of the receiver coil 112 in FIG. 6 surrounding a battery 13D according to an embodiment.

The receiver coil 112 may surround the battery 130 and the receiver coil 112 may be partially surrounded by the coating 142.

The coating 142 may also include a gap 144 dimensioned and arranged to prevent the electrical current from generating a magnetic field (not shown) which may further generate a further electrical current (not shown).

Figure 8:
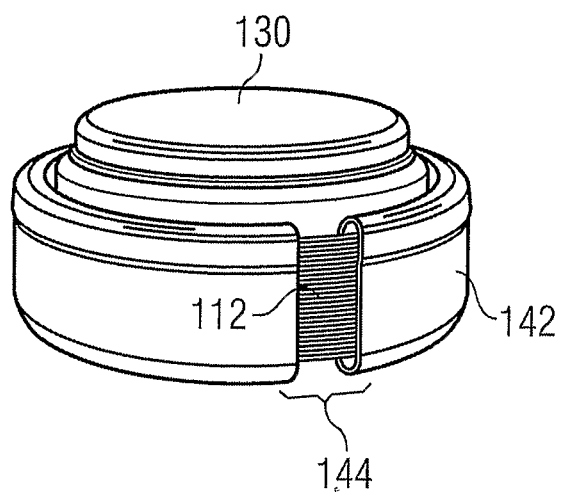
FIG. 8 shows a three-dimensional perspective view of a battery surrounded by a receiver coil in a left side hearing aid according to an embodiment.

FIG. 8 shows a three-dimensional (3D) perspective view of a battery 130 surrounded by a receiver coil 112 in a left side hearing aid 104 according to an embodiment.

Similar to FIG. 7, the receiver coil 112 may surround the battery 130 and the receiver coil 112 may be partially surrounded by the coating 142.

The coating 142 may also include a gap 144 dimensioned and arranged to prevent the electrical current from generating a magnetic field (not shown) which may further generate a further electric field (not shown) within the coating 142.

Figure 9:
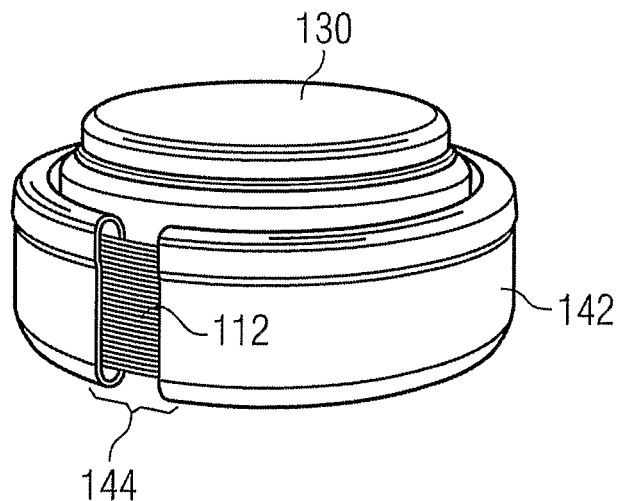
FIG. 9 shows a three-dimensional perspective view of a battery surrounded by a receiver coil in a right side hearing aid according to an embodiment.

FIG. 9 shows a three-dimensional perspective view of a battery 130 surrounded by a receiver coil 112 in a right side hearing aid 104 according to an embodiment.

The battery 130 and the receiver coil 112 as shown in FIG. 9 may be different from that as shown in FIG. 8 in that the battery 130 and the receiver coil 112 as shown in FIG. 8 may be used in the left side hearing aid 104 and the battery 130 and the receiver coil 112 as shown in FIG. 9 may be used in the right side hearing aid 104.

Figure 10:
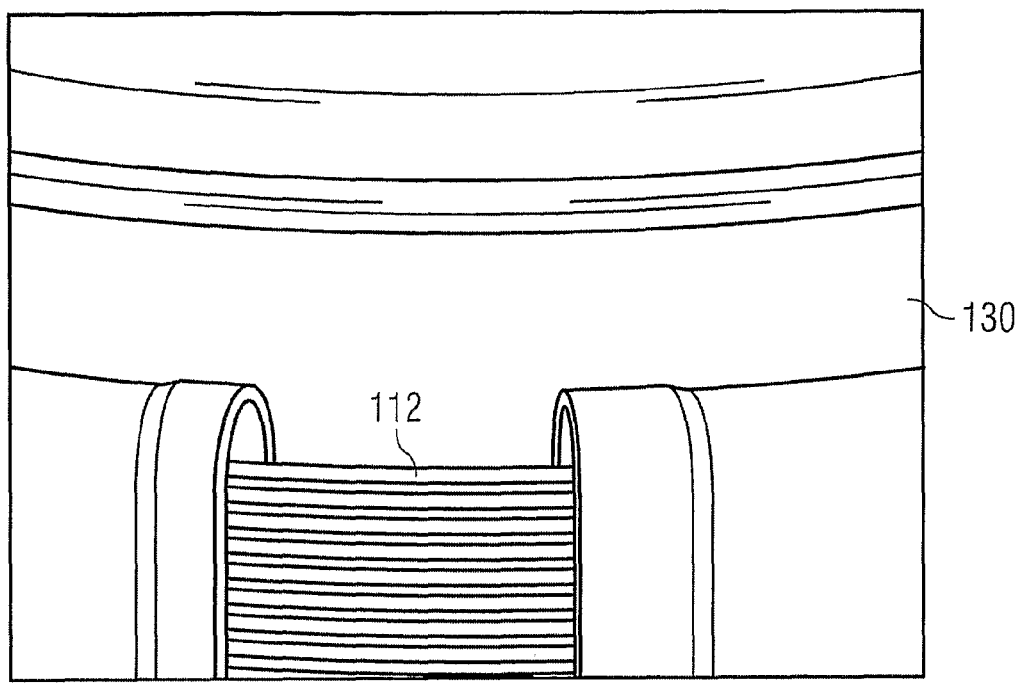
FIG. 10 shows a three-dimensional enlarged perspective view of a battery surrounded by a receiver coil as shown in FIG. 9 according to an embodiment.

FIG. 10 shows a three-dimensional enlarged perspective view of a battery 130 surrounded by a receiver coil 112 as shown in FIG. 9 according to an embodiment.

Figure 11:
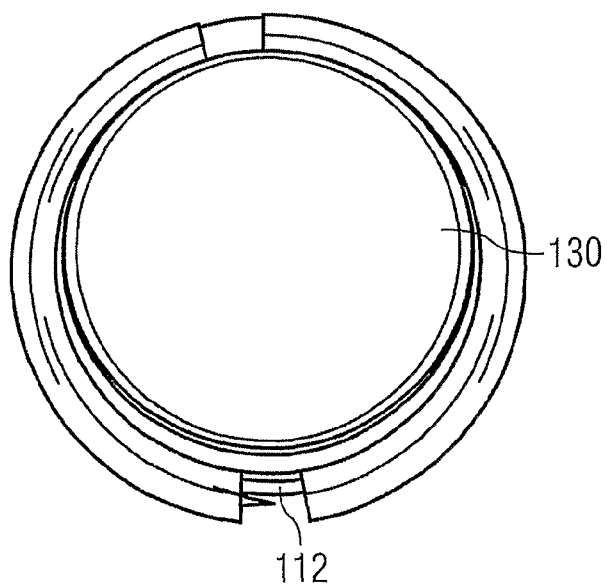
FIG. 11 shows a top view of a battery surrounded by a receiver coil in a hearing aid according to an embodiment.

FIG. 11 shows a top view of a battery 130 surrounded by a receiver coil 112 in a hearing aid 104 according to an embodiment.

Figure 12:
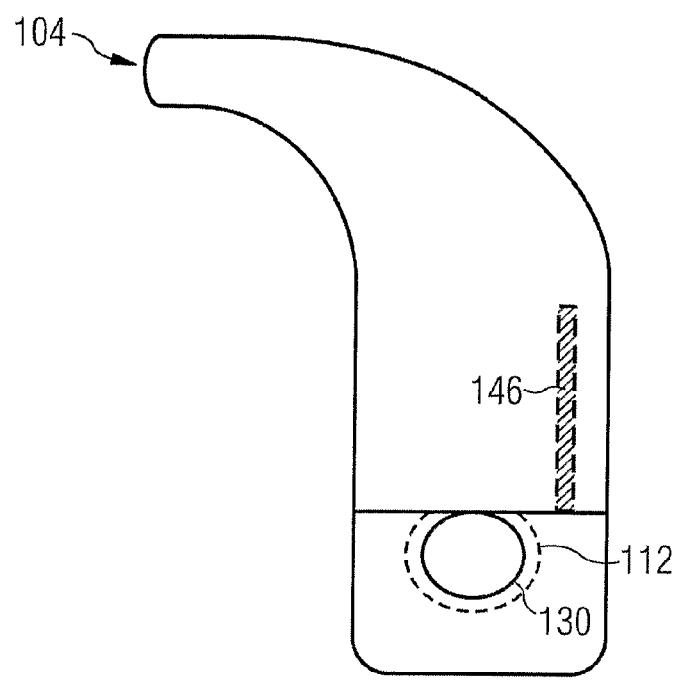
FIG. 12 shows a perspective view of a behind-the-ear hearing aid including a battery surrounded by a receiver coil according to an embodiment.

FIG. 12 shows a perspective view of a behind-the-ear (BTE) hearing aid 104 including a battery 130 surrounded by a receiver coil 112 according to an embodiment. The BTE hearing aid 104 further include a PCB 146 on which the rectifying circuit (now shown), the loading circuit (not shown) or the electronic component(s) (not shown) may be arranged on.

Figure 13:
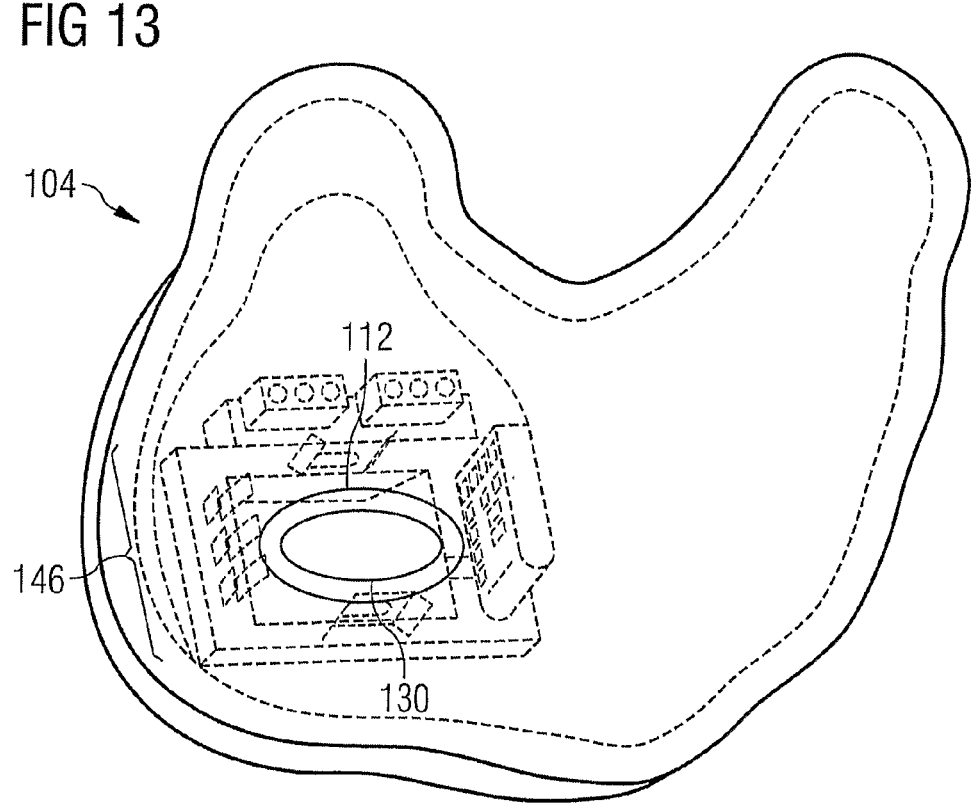
FIG. 13 shows a perspective view of an in-the-ear hearing aid including a battery surrounded by a receiver coil according to an embodiment.

FIG. 13 shows a perspective view of an in-the-ear (ITE) hearing aid 104 including a battery 130 surrounded by a receiver coil 112 according to an embodiment. The ITE hearing aid 104 further include a PCB 146 on which the rectifying circuit (now shown), the loading circuit (not shown) or the electronic component(s) (not shown) may be arranged on.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A hearing aid, comprising:
   a set of battery charging terminals configured to be connected to a battery;
   a receiver oscillator circuit electrically coupled to said set of battery charging terminals, said receiver oscillator circuit having a receiver coil tuned to resonate at a resonance frequency in a range of MHz, and at the resonance frequency said receiver coil configured to receive magnetic energy in a form of electromagnetic waves of a frequency similar to the resonance frequency of said receiver coil and to convert the magnetic energy of the electromagnetic waves received to an electrical current to charge the battery via said set of battery charging terminals; and
   a coating partially surrounding said receiver coil.

2. The hearing aid according to claim 1, wherein said receiver oscillator circuit has a receiver resistor.

3. The hearing aid according to claim 1, wherein said receiver oscillator circuit further has a receiver capacitor, said receiver capacitor is variable so as to tune said receiver coil to resonate at the resonance frequency.

4. The hearing aid according to claim 1, further comprising a rectifying circuit electrically coupled to an output of said receiver oscillator circuit.

5. The hearing aid according to claim 4, wherein said rectifying circuit is configured to receive an alternating current signal from said receiver oscillator circuit and to convert the alternating current signal to a direct current signal to be provided to the battery.

6. The hearing aid according to claim 1, further comprising a loading circuit electrically coupled to said set of battery charging terminals.

7. The hearing aid according to claim 6, wherein said loading circuit has an electrical component selected from the group consisting of a microphone, a signal processing circuit, a loud speaker and a volume control.

8. The hearing aid according to claim 1, wherein said receiver coil is positioned such that said receiver coil surrounds the battery.

9. The hearing aid according to claim 1, further comprising a battery chamber housing, said receiver coil is disposed in said battery chamber housing.

10. The hearing aid according to claim 1, wherein said coating has a gap dimensioned and disposed to prevent electrical current from generating a further magnetic field which further generates a further electrical field.

11. The hearing aid according to claim 1, wherein said coating contains a permeable material.

12. The hearing aid according to claim 1, wherein said coating contains a plastic hose.

13. The hearing aid according to claim 1, wherein the hearing aid is selected from the group consisting of a behind-the-ear hearing aid, an in-the-ear hearing aid, an in-the-canal hearing aid and a completely-in-the-canal hearing aid.

* * * * *